(12) United States Patent
Guerra et al.

(10) Patent No.: US 9,290,619 B2
(45) Date of Patent: Mar. 22, 2016

(54) TRIAZINE CONTAINING FLUOROPOLYETHER ELASTOMERS HAVING LOW GLASS TRANSITION TEMPERATURE

(75) Inventors: Miguel A. Guerra, Woodbury, MN (US); Rudolf J. Dams, Antwerp (BE); Steven G. Corveleyn, Knokke-Heist (BE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 100 days.

(21) Appl. No.: 14/003,141

(22) PCT Filed: Feb. 24, 2012

(86) PCT No.: PCT/US2012/026425
§ 371 (c)(1),
(2), (4) Date: Nov. 18, 2013

(87) PCT Pub. No.: WO2012/121898
PCT Pub. Date: Sep. 13, 2012

(65) Prior Publication Data
US 2014/0073737 A1 Mar. 13, 2014

Related U.S. Application Data

(60) Provisional application No. 61/449,128, filed on Mar. 4, 2011.

(51) Int. Cl.
*C08G 67/02* (2006.01)
*C08K 5/16* (2006.01)
*B01J 8/36* (2006.01)
*C08G 73/24* (2006.01)
*C08G 65/00* (2006.01)
*C08L 71/00* (2006.01)

(52) U.S. Cl.
CPC .............. *C08G 65/00* (2013.01); *C08G 65/007* (2013.01); *C08L 71/00* (2013.01); *C08G 2650/48* (2013.01)

(58) Field of Classification Search
None
See application file for complete search history.

(56) References Cited

U.S. PATENT DOCUMENTS

| | | | |
|---|---|---|---|
| 3,125,599 A | 3/1964 | Warnell |
| 3,250,808 A | 5/1966 | Moore |
| 3,392,097 A | 7/1968 | Gozzo |
| 3,646,085 A | 2/1972 | Bartlett |
| 3,699,145 A | 10/1972 | Sianesi |
| 3,810,874 A | 5/1974 | Zollinger |
| 4,094,911 A | 6/1978 | Mitsch |
| 4,102,872 A | 7/1978 | Griffin |
| 4,434,106 A | 2/1984 | Rosser |
| 4,647,413 A | 3/1987 | Savu |
| 5,446,205 A | 8/1995 | Marchionni |
| 5,545,693 A | 8/1996 | Hung |
| 5,593,748 A | 1/1997 | Hubbard |
| 5,605,973 A | 2/1997 | Yamamoto |
| 5,693,748 A | 12/1997 | Ikeda |
| 5,700,879 A | 12/1997 | Yamamoto |
| 5,714,637 A | 2/1998 | Marchionni |
| 5,767,204 A | 6/1998 | Iwa |
| 6,114,452 A | 9/2000 | Schmiegel |
| 6,281,296 B1 | 8/2001 | MacLachlan |
| 6,465,576 B1 | 10/2002 | Grootaert |
| 6,638,999 B2 | 10/2003 | Bish |
| 6,716,534 B2 | 4/2004 | Moore |
| 6,835,782 B1 | 12/2004 | Morita |
| 6,956,085 B2 | 10/2005 | Grootaert |
| 7,521,510 B2 | 4/2009 | Aufdermarsh |
| 2004/0019153 A1 | 1/2004 | Coughlin |
| 2007/0141425 A1 | 6/2007 | Arase |

FOREIGN PATENT DOCUMENTS

| | | | |
|---|---|---|---|
| EP | 1 829 905 B1 | 12/2008 |
| WO | WO 01/27194 A1 | 4/2001 |
| WO | WO 2007/050600 A1 | 5/2007 |
| WO | WO 2011/044093 A2 | 4/2011 |
| WO | WO 2012/005972 A1 | 1/2012 |

OTHER PUBLICATIONS

Van Cleeff, Albert, "Fluoroelastomers", Modern Fluoropolymers High Performance Polymers for Diverse Applications, John Wiley & Sons Ltd, pp. 597-614 (1997).

Paciorek, K.J.L., et al., "Reactions of perfloronitriles I interactions with aniline", Journal of Fluorine Chemistry, 1985, vol. 30, pp. 241-250.

International Search Report for International PCT Application No. PCT/US2012/026425, Mailed on Jun. 19, 2012, 3 pages.

*Primary Examiner* — Susannah Chung
*Assistant Examiner* — Robert T Butcher
(74) *Attorney, Agent, or Firm* — C. Michael Geise

(57) ABSTRACT

There is provided a curable composition comprising: a) fluoropolyethers having a molecular weight of from about 400 g/mole up to about 20,000 g/mole and containing moieties selected from (—($CF_2$)$_4$O—), (—($CF_2$)$_2$O—), (—$CF_2$O—) or combinations thereof and further containing at least one nitrile group at a terminal position or at a position that is adjacent to the terminal position; and b) one or more curing agents selected from non-fluorinated compounds containing one or more functional group linked to a common residue, said residue containing at least three carbon atoms wherein the functional groups are selected from primary amines, secondary amines and functional groups that generate primary or secondary amines upon heat treatment, wherein the composition can be cured by generating groups having a triazine structure. Also provided are cured composition, methods of making cured compositions, articles made by curing the cured compositions and methods of making articles using the curable composition.

13 Claims, No Drawings

TRIAZINE CONTAINING FLUOROPOLYETHER ELASTOMERS HAVING LOW GLASS TRANSITION TEMPERATURE

FIELD

The present disclosure relates to triazine containing fluoropolyether polymers having low glass transition temperatures and that are suitable as elastomers, compositions containing them, their precursor compositions and to methods of making them and to articles containing them.

BACKGROUND

Fluoroelastomers are widely used as materials for seals and hoses in the automotive or aircraft industry because of their elastomeric properties and resistance to heat and chemicals, in particular fuel fumes. In many such applications it is desired that the fluoroelastomers retain their elastomeric properties over a wide temperature range to guarantee their sealing properties. In particular when used in aircrafts, watercrafts or motor vehicles in general, fluoroelastomers are desired that retain their elastomeric properties also at temperatures below $-50°$ C. or even below $-70°$ C. More eminent is the need for materials Therefore, fluoroelastomers having very low glass transition temperatures (Tg) are desired. A particular desire for materials having a low glass transition temperature exists in the field of cryogenic applications like the production and storage of liquefied gases.

A wide range of fluoroelastomers containing copolymers of tetrafluoroethylene, or copolymers of vinylidenefluoride are known and commercially available (compare A van Cleef, in Modern Fluoropolymers, John Scheirs ed., John Wiley & Sons, 1997, pages 597-613).

Fluoroelastomer compositions of high chemical and temperature resistance and good mechanical properties may be prepared by curing a system comprising copolymers of vinylidene fluoride and/or tetrafluoroethylene with perfluorovinyl ethers and cure site monomers. Typically, glass transition temperatures of about $-30°$ C. can be obtained with such systems, as described, for example in European Patent Number 1 829 905 B1. However, the manufacturing costs of perfluorovinyl ethers are comparatively high.

Therefore, there has been a desire to provide fluoroelastomers having low glass transition temperatures to allow for their application as seals in low temperature applications. Therefore, there has been a need to provide fluoropolymers having a glass transition temperature below $-60°$ C., preferably below $-80°$ C. or even lower. Favourably, the materials are elastomers. Desirably, such materials can be prepared at low costs.

Surprisingly, it has now been found that fluoropolymers having very low glass transition temperatures and mechanical properties that make them suitable as elastomers can be made by curing a nitrile-functional low molecular weight fluoropolyether with a curing agent under the formation of triazine group containing linkages. While perfluoropolyethers have been known in the fluoropolymer industry they have been widely used as lubricants or liquid seals due to the fact that they tend to be liquids. The use of perfluoropolyether-based polytriazines as a raw material for making elastomers alongside the known application as lubricants was contemplated in U.S. Pat. No. 5,693,748. Fluoropolyether polytriazines carrying pendant nitrile groups were cured using ammonia as curing catalyst. The resulting polymer was reported to have a Tg in the range of $-45°$ C. However, the cured polymers were reported to be brittle when the polymer unit bearing the pendant nitrile group had a molecular weight of less than about 25,000 g/mole per nitrile group. Such materials were reported to be not suitable as elastomers.

SUMMARY

Therefore, in the following is provided a curable composition comprising
  a) fluoropolyethers having a molecular weight of from about 400 g/mole up to about 20,000 g/mole and containing moieties selected from (—$(CF_2)_4O$—), (—$(CF_2)_2O$—), (—$CF_2O$—) or combinations thereof and further containing at least one nitrile group at a terminal position or at a position that is adjacent to the terminal position;
  b) one or more curing agents selected from non-fluorinated compounds containing one or more functional group linked to a common residue, said residue containing at least three carbon atoms wherein the functional groups are selected from primary amines, secondary amines and functional groups that generate primary or secondary amines upon a heat treatment,
    wherein the composition can be cured to generate groups having a triazine ring structure.

In another aspect there is provided a composition comprising a cured fluoropolyether-based polymer containing fluoropolyether segments having a molecular weight of from about 400 g/mole up to about 20,000 g/mole and containing a plurality of moieties selected from (—$(CF_2)_4O$—), (—$(CF_2)_2O$—), (—$CF_2O$—) or combinations thereof and being separated by groups having a triazine ring structure, wherein the composition has a glass transition temperature of at least $-60°$ C.

In a further aspect there is provided a method of making a composition comprising a cured fluoropolyether-based polymer having groups with a triazine ring structure and a glass transition temperature of less than $-60°$ C. said method comprising
  i) providing a curable composition comprising
  a) fluoropolyethers having a molecular weight of from about 400 g/mole up to about 20,000 g/mole and containing moieties selected from (—$(CF_2)_4O$—), (—$(CF_2)_2O$—), (—$CF_2O$—) or combinations thereof and further containing at least one nitrile group at a terminal position or at a position that is adjacent to the terminal position; and
  b) one or more curing agents selected from non-fluorinated compounds containing one or more functional group linked to a common residue, said residue containing at least three carbon atoms wherein the functional groups are selected from primary amines, secondary amines and functional groups that generate primary or secondary amines upon heat treatment;
    ii) subjecting that curable composition to heat curing to create groups having a triazine ring structure.

In yet another aspect there is provided a molded article comprising a cured fluoropolyether-based polymer containing fluoropolyether segments having a molecular weight of from about 400 g/mole up to about 20,000 g/mole and containing a plurality of moieties selected from (—$(CF_2)_4O$—), (—$(CF_2)_2O$—), (—$CF_2O$—) or combinations thereof separated by groups having a triazine ring structure, wherein the composition has a glass transition temperature of at least $-60°$ C.

In yet a further aspect there is provided a method of making a shaped article comprising injection or compression molding a curable composition comprising
  a) fluoropolyethers having a molecular weight of from about 400 g/mole up to about 20,000 g/mole and containing moieties selected from —(CF$_2$)$_4$O—), (—(CF$_2$)$_2$O—), (—CF$_2$O—) or combinations thereof and further containing at least one nitrile group at a terminal position or at a position that is adjacent to the terminal position; and b) one or more curing agents selected from non-fluorinated compounds containing one or more functional group linked to a common residue, said residue containing at least three carbon atoms wherein the functional groups are selected from primary amines, secondary amines and functional groups that generate primary or secondary amines upon a heat treatment.

DETAILED DESCRIPTION

Before any embodiments of this disclosure are explained in detail, it is to be understood that the disclosure is not limited in its application to the details of compositions and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to be of broad scope and is meant to encompass the items listed thereafter, equivalents thereof and further items. The word "consisting of" is meant to be of limiting scope and is meant to encompass only the items listed thereafter and equivalents thereof but not any additional items. The term "consisting essentially of" has a meaning as defined in the description below.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

Fluoropolyethers

Suitable fluoropolyethers are molecules containing moieties selected from (—C$_4$F$_8$O—), (—C$_2$F$_4$O—), (—CF$_2$O—) or combinations thereof, for example units selected from (—C$_2$F$_4$O—) and (—CF$_2$O—); (—C$_4$F$_8$O—), (—C$_2$F$_4$O—) and (—CF$_2$O—); or (—C$_4$F$_8$O—) and (—C$_2$F$_4$O—). These units may be present in a random order.

The fluoropolyethers can have a linear backbone or they can be branched (in which case the backbone may comprise side chains). Side chains may be present, for example, if the fluoropolyethers further contain, in addition to the units above, branched (—C$_3$F$_6$O—) units and/or when the (—C$_4$F$_8$O—) is branched.

The fluoropolyethers contain at least one nitrile group or (per)fluoroalkylnitrile group. The one or more nitrile groups are positioned at a terminal position of the fluoropolyethers, or at a position adjacent to the terminal position. The term "terminal position" as used herein encompasses the terminal position of the backbone and the terminal position of a side chain in case of non-linear fluoropolyethers.

Preferably, the fluoropolyethers contain one or two terminal nitrile or perfluoroalkyl nitrile groups. The fluoropolyethers may contain two or more than two nitrile (or (per) fluoroalkyl nitrile) groups, i.e. the fluoropolyethers may be bifunctional or multifunctional. More preferably, the fluoropolyethers are perfluoropolyethers and contain one or two terminal nitrile (or (per)fluoroalkyl) groups.

In a preferred embodiment, the fluoropolyethers are perfluorinated. As used herein above and below the term "perfluorinated" means an organic group or an organic compound wherein all hydrogen atoms have been replaced by fluorine atoms. A perfluorinated group may, however, still contain other atoms than fluorine and carbon atoms, like, for example nitrogen atoms, oxygen atoms, chlorine atoms, bromine atoms and iodine atoms. For example, a F$_3$C— or a F$_3$C—O— would be a perflourinated methyl or a perfluorinated methoxy groups, respectively. Contrary to perfluorinated groups or compounds, a group or compound where not all hydrogen atoms have been replaced will be referred to herein as a "partially fluorinated" group or compound. For example, a F$_2$HC— or a F$_2$HC—O— group would be a partially fluorinated methyl or methoxy group, respectively.

Preferably, the fluoropolyethers consist essentially of units selected from (—CF$_2$O—), (—C$_2$F$_4$O—) or (—C$_4$F$_8$O—), or a combination of one or more of (—CF$_2$O—), (—C$_4$F$_8$O—) and (—C$_2$F$_4$O—) units and additionally, but optional, also (—C$_3$F$_6$O—) units. The term "consisting essentially of" as used herein means the compound contains at least 80 mole %, preferably at least 90 mole %, of the afore-mentioned units.

The remainder of the backbone preferably includes perfluorinated alkyl and/or perfluorinated alkylene groups wherein the carbon chain of those groups may or may not be interrupted by oxygen atoms. These groups may link the nitrile functional groups to the fluoropolyether segments.

Typical examples of fluoropolyether include those represented by the general formula

wherein X and Y independently from each other represent a nitrile, a (per)fluoroalkylnitrile or a (per)fluoroalkyl group with the proviso that at least one of X or Y is a nitrile or (per)fluoroalkylnitrile group, A denotes a fluoropolyether unit comprising a plurality of units selected from (—(CF$_2$)$_4$O—), (—(CF$_2$)$_2$O—), (—CF$_2$O—) or combinations thereof. The fluoropolyether units may additionally also contain (—C$_3$F$_6$O—) units. Preferably, the polyether unit A consists or essentially consists of the units (—(CF$_2$)$_4$O—), (—(CF$_2$)$_2$O—), (—CF$_2$O—) or combinations thereof such as combinations of (—(CF$_2$)$_4$O—) and (—(CF$_2$)$_2$O—) units; (—(CF$_2$)$_4$O—), (—(CF$_2$)$_2$O—) and (—CF$_2$O—) units, (—(CF$_2$)$_2$O—) and (—CF$_2$O—) units; (—(CF$_2$)$_4$O—) and (—CF$_2$O—) units. Optionally, the fluoropolyether segment A can also contain in addition to these units and/or their combinations (—C$_3$F$_6$O—) units.

The fluoropolyethers are typically liquids (at ambient conditions like about 25° C. and about 1 bar pressure). They are also of low molecular weight. The fluoropolyethers generally have a molecular weight of less than about 20,000 g/mole or less than about 15,000 g/mole, typically from about 400 g/mole to about 15,000 g/mole, preferably from about 450 to about 9,000 g/mole. The fluoropolyethers may be mixtures and the molecular weight referred to above may be the weight average molecular weight (as can be determined, for example, by size exclusion chromatography). Also mixtures of fluoroplyethers or perfluoropolyethers and mixtures of fluoropolyethers and perfluoropolyethers may be used. If mixtures are used the average functionality (i.e. the number of nitrile groups per (per)fluoropolyether) is desirably between 0.5 and 2.5.

It is an advantage of the present invention that a liquid composition can be used for making fluoroelastomers as this may allow the use of injection molding processes or reduces the costs for injection molding. The viscosity can be conveniently adapted by adding fillers to create a more paste-like consistency. Also the application in compression molding or other form shaping processes may be more cost-effective as liquid or paste-like compositions can be used by which the molds can be filled more effectively without generating waste.

Fluoropolyethers as described above and their synthesis have been know and described. For example, perfluoropolyethers having a backbone characterized by blocks of —CF$_2$CF$_2$O— units can be made from tetrafluoroethylene epoxide, as described in U.S. Pat. No. 3,125,599. Others, made by reacting oxygen with tetrafluoroethylene are characterized by a backbone made of repeating —CF$_2$O— units (see for example U.S. Pat. No. 3,392,097). Perfluoropolyethers having a backbone of —C$_3$F$_6$O— units in combination with —CF$_2$O— and —CF(CF$_3$)O— units are described for example in U.S. Pat. No. 3,699,145. Further useful examples of perfluoropolyethers include those having a backbone of repeating —CF$_2$O— and —CF$_2$CF$_2$O— units (as is disclosed in U.S. Pat. No. 3,810,874). Perfluoropolyethers can be also obtained by the polymerization of HFPO using dicarboxylic fluorides as polymerization initiators, as is described for example in U.S. Pat. Nos. 4,647,413 and 3,250,808. Perfluoropolyethers derived from HFPO contain branched perfluoroalkyl groups and at least one of the units (—C$_3$F$_6$O—) is not linear, e.g. the (—C$_3$F$_6$O—) is a —CF$_2$—CF(CF$_3$)—O— unit. HFPO derived perfluoropolyethers are also commercially available, for example, under the trade designation of KRYTOX, available from DuPont de Nemours. Fluoropolyether, in particular of the linear type and including functionalised fluoropolyethers are also commercially available, for example under the trade designation of FOMBLIN, FOMBLIN Z DEAL from Solvay Solexis and DEMNUM from Daikin. The conversion of functionalised fluoropolyethers into fluoropolyethers containing nitrile groups can be carried out by known methods of organic synthesis. Fluoropolyethers having nitrile functional groups can be obtained, for example, from the corresponding precursor perfluoropolyethers as is described, for example, in U.S. Pat. Nos. 3,810,874; 4,647, 413; or 5,545,693. By their way of synthesis, the precursor perfluoropolyethers typically have acid fluoride end groups. These acid fluoride end groups may be converted to esters via reaction with an appropriate alcohol (such as methanol). The esters may be subsequently converted to amides via reaction with ammonia. The amides may then be dehydrated to nitriles in an appropriate solvent (such as DMF) with pyridine and trifluoroacetic anhydride. Alternatively the amides may be dehydrated with other reagents such as P$_2$O$_5$ or PCl$_3$.

Curing Agents

The curing agents referred to herein are non-fluorinated compounds and contain at least one, preferably two reactive groups separated by a linking group. The reactive groups include primary or secondary amine groups or a blocked primary or blocked secondary amine groups. With "primary amine" group is meant a —NH$_2$ group, where the nitrogen is bonded to one carbon atom; with a "secondary amine" group is meant a —NH— group; where the nitrogen is bonded to two different carbon atoms. "Blocked amines" as referred to herein are compounds which decompose upon heating to produce at least one primary or secondary amine. Preferably, they decompose at a temperature between 40° C. and 200° C., or between 80° C. and 170° C. The amine groups are thus generated in situ, i.e. during the curing reaction. Examples of blocked amines include carbamates.

These functional groups are capable of reacting with the nitrile groups of the fluoropolyethers to form triazine groups linking the fluoropolyether molecules and forming a cured polymer. The curing agents get consumed and incorporated (at least with the linking group described below) into the polymer structure during the curing reaction, which distinguishes them from curing catalysts. Curing catalysts are not consumed or do not get incorporated into the polymer. It is to be understood that the curing agents provided herein may not be completely integrated into the polymer, by which is meant that all curing agents used in the reaction have to found in the polymer structure. It may well be that some of the curing agents may decompose or undergo side reactions. However, it is meant that at least some of the curing agents provided herein will be incorporated into the polymer by forming a part of the groups with the triazine ring structure as described below.

The curing agents may be of low molecular weight, by which is meant that they may have a molecular weight of less than 2,000 g/mole, less than about 1,500 g/mole or, preferably, less than 1,000 g/mole. Low molecular weight curing agents may be preferred if fluoropolyether-based compositions are to be prepared that have a high fluorine content, for examples a fluorine content of 50% by weight or above, as may be desirable for materials with high chemical resistance.

The curing agents typically are non-fluorinated compounds containing one or more primary or secondary amino groups, which may be blocked, connected by a linking group. The linking group (or residue in case the curing agent is only monofunctional) contains at least three carbon atoms.

Suitable curing agents include those represented by the general formula:

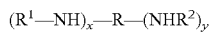

wherein each R$^1$ and R$^2$ independently represent H, an aliphatic group or a group —COOR' with R' representing H, an ammonium compound, a metal atom or an alkyl group.

R represents a linking group linking the functional groups (R$^1$—NH)$_x$— and —(NHR$^2$)$_y$ and contains at least 3 carbon atoms. Preferably, R is selected from linear or branched alkylenes, aryls, heteroaryls, arylalkylenes and heteroarylalkylenes. The alkylenes may contain heteroatoms interrupting the carbon chain, for example oxygen atoms. The residue R may also be halogen substituted, which means R can contain halogen atoms selected from Cl, Br and I.

Examples of suitable curing agents include aliphatic, aromatic, heterocyclic or alicyclic primary or secondary amines, diamines or polyamines. Particular useful examples include alkylene diamines (for example but not limited to ethylenediamine and hexamethylenediamine), aniline, melamine and bisphenol diamine.

Examples of curing agents containing blocked amines include di- or poly-substitutedureas (e.g. 1,3-dimethyl urea); N-alkyl or -dialkyl carbamates (e.g. N-(tert-butyloxycarbonyl)propylamine); di- or poly-substituted thioureas (e.g. 1,3-dimethyl-thiourea); aldehyde-amine condensation products (e.g. 1,3,5-trimethylhexahydro-1,3,5-triazine) and N,N'-dialkyl phthalamide derivatives (e.g. N,N'-dimethylphthalamide).

Particular useful examples of blocked amines include hexamethylene diamine carbamate, commercially available from DuPont under the trade designation DIAK 1.

Methods of Making Cured Fluoropolyether-Based Polymers

By subjecting a composition containing the fluoropolyethers and curing agents as described above to heat curing the nitrile and amine groups react to form groups having a triazine ring structure linking the fluorpolyethers and forming a cured polymer.

Groups containing a triazine ring structure may be formed by subjecting the fluoropolyethers and curing agents to a heat treatment, for example a heat-treatment of at least 40° C., or at least 50° C. Typically, the heat treatment involves temperatures of from about 80° C. to about 180° C. Pressure may be applied during the heat treatment, for example pressures from about 1 to 20 bar.

Upon curing the nitrile groups of the fluoropolyethers react with the reactive groups of the curing agents to form groups having a triazine ring structure which link the fluoropolyethers. Preferably, the curing agent is such that it gets incorporated into the triazine ring structure. This means that the residue or linking groups of the curing agent as described above forms a side chain or part of a side chain of the triazine ring structure. Groups having a triazine ring structure can be represented by the general formula

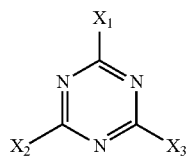

wherein X1, X2 and X3 represent a chemical bond. The chemical bonds may link the triazine ring structure to the fluoropolyethers and/or the residual groups from the curing agents. Typically, at least one, preferably at least two of the chemical bonds link the ring structure to fluoropolyethers.

The resulting polymers have low glass transition temperatures, for example glass transition temperatures of less than −60° C., less than −80° C. or even less than −100° C. The materials are suitable as elastomers and have an elongation at break of at least 10%.

Mechanical properties like hardness and tensile strength can be optimized or fine-tuned by adjusting the cross-linking density. An increase of cross-linking density may increase the hardness of the polymer. Reducing the cross-linking density may increase the elongation at break. Increasing the cross-linking density can be achieved, for example, by increasing the amounts of functional groups available for cross-linking.

To increase the chemical resistance of the polymers provided herein, their fluorine content is desirably high, like for example greater than 50% by weight or even greater than 60% by weight. Materials with high fluorine content can be prepared by choosing the amounts and ratio of the ingredients, for example to use the fluoropolyethers in appropriate excess over the curing agents and/or using curing agents of low molecular weight as described above.

Typically, from 0.1 to 10 parts, or from 0.2 to 5 parts of curing agents may be used per 100 parts fluoropolyethers (all based on weight) to obtain compositions containing fluoropolyether-based polymers having at least one or all of the mechanical properties described below. This means the fluoropolyethers and curing agents may be used in a weight ratio of fluoropolyethers to curing agents that is greater than 5, or greater than 15, or greater than 50 or even greater than 300.

Preferably, fluoropolyethers and curing agents may be adjusted such that the molar ratio of nitrile groups of the fluoropolyethers to reactive groups of the curing agents is at least or greater than 1, preferably greater than 4.5 or even greater than 9.0. Typical molar ratios of nitrile groups of fluoropolyethers to reactive groups of curing co-agents (amine or blocked amine groups) include ratio of from 2.5:1 to 5:1 or from 10:1 up to 20:1 or even up to 100:1. Preferably, low molecular weight curing agents as described above are used.

To prepare the curable fluoropolyether compositions (or elastomer precursor compositions), the ingredients are intimately mixed. Known mixing devices such as, for example, rotary mixers, double planetary mixers, a high speed dispenser or a speed mixer available under the trade designation "Hauschild Speedmixer" may be used. The curable fluoropolyether compositions are typically liquids or pastes. The pastes typically have a Brookfield viscosity between 2,000 and 50,000 centipoises at 25° C.

Fillers and other additives may be added to the curable compositions. Preferably the fillers and the other additives are added before curing the composition. The fillers may be added to increase the viscosity of the fluoropolyether-curing agent mixture, which typically is a liquid, to obtain a paste-like consistency to facilitate handling. Fillers may also increase the hardness and tensile strength of the cured composition.

Fillers are typically particles. The particles may be spherical or non-spherical particles. They may be rods or fibers. Typically the fillers are microsized materials. Typically they have a least one dimension being a length or a diameter of from about 0.01 μm or 0.05 μm up to about 5,000 μm, up to about 1,000 μm, or up to about 500 μm. Fillers, in particular carbon or silica-containing materials are available in particles sizes (number average) as small as between 0.05 and 30 μm.

Fillers include inorganic or organic materials. Typical fillers include silicone oxide containing materials. Examples of silicon oxide containing fillers include silicas (also referred to as silicon dioxides). Specific examples of silicas include hydrophilic and hydrophobic silica, fumed silica (which are, for example, commercially available under the trade designation "AEROSIL" from Evonik GmbH, Frankfurt, Germany, such as, for example, AEROSIL 200, AEROSIL R972 or AEROSIL R974; available under the trade designation "NANOGEL" from Cabot Corporation), silane-treated fumed silicas (commercially available, for example, under the trade designation "CABOSIL" from Cabot Corporation) and combinations thereof. Further examples include silicates such as, for example, calcium silicates, aluminium silicates, magnesium silicates and mixtures thereof, such as for example mica, clays and glasses, such as for example glass spheres (commercially available under the trade designation "GLASSBUBBLES" from 3M Company). Further suitable fillers include nitrile-modified silicas. Nitrile-modified silicas can for example be prepared by reacting a commercially available hydroxyl containing silica, such as, for example, AEROSIL 200V (available from Evonik), with a cyano-silane, such as, for example, 3-cyanopropyltriethoxysilane (available from Aldrich), in the presence of ethanol containing hydrochloric acid. The amount of reactants is chosen so as to obtain between 10 and 30% (by weight) of nitrile-modified silica. Further suitable silica-containing fillers include fluorine-modified silicas. Fluorine-modified silicas can be prepared, for example, by reacting a commercially available hydroxyl containing silica, (for examples AEROSIL 200V) with a fluorosilane. A suitable fluorosilane includes HFPO-silanes, which may be prepared from oligomeric HFPO-esters and a silane, such as for example aminoalkyltrialkoxy silane, as is described in U.S. Pat. No. 3,646,085. Further suitable fluorosilanes can be derived from commercially available perfluoropolyethers, such as, for example, FOMBLIN Z Deal (Solvay Solexis) that have been reacted with aminoalkyltrialkoxy silanes, such as 3-aminopropyltrimethoxysilane, as is described in U.S. Pat. No. 6,716,534. The amount of reactants is typically chosen so as to obtain between 1 and 5% (by weight) of fluorine modified silica.

Other examples of suitable fillers include carbon materials. Carbon materials include, for example, carbon nanotubes, carbon black or subtypes thereof like, for example, acetylene black, modified carbons, such as, for example graphite fluoride (available, for example, from Central Glass) or Carbofluor (available from Advanced Research Co). Carbon black is commercially available, for example, from Cabot Corporation.

The fillers may be added in an amount between 3 to 50 parts, or between 10 and 30 parts, by weight per hundred parts by weight of fluoropolyethers (phr).

The curable fluoropolyether compositions (and also the cured fluoropolyether compositions) may include further additives. Examples include pigments, antioxidants, processing aids, rheology modifiers, lubricants, flame retardants, flame retardant synergists, antimicrobials, and further additives known in the art of fluoropolymer compounding and rubber processing, like oxygen scavengers (e.g. metal oxides, for example, magnesium oxide and calcium oxide).

Further additives may include curing catalysts although they are not required, which is a further advantage of the methods provided herein. Curing catalysts as used herein are compounds that enable triazine formation, such as for example, ammonia and organo metal compounds such as for example butyl tin compounds.

Where desirable, the crosslink density of the cured fluoropolyether polymers can be increased by adding a peroxide curing agent. The peroxide curing agent will cause crosslinking through the nitrile groups, however not forming triazine groups. Useful examples of peroxide curing agents include dicumyl peroxide.

Curing may be carried out in molds. Molds typically used in curing rubbers and rubber processing may be employed. Curing may be carried out in open air, for example open molds, but is preferably carried out in closed molds. Curing in closed molds offers the advantage of not exposing the operators to fumes generated during the curing reaction. Therefore, an advantage of the curable compositions and methods provided herein lies in the fact that the compositions can be cured to yield the elastomers as described below in closed molds.

Curing is typically achieved by heat-treating the composition. The heat-treatment is carried out at an effective temperature and effective time to create a cured composition having groups with triazine ring structures. Optimum conditions can be tested by examining the resulting cured polymer for its mechanical and physical properties. Typically, the curing is carried out at a temperature of greater than −100° C., greater than 150° C. or at least 177° C. Typical curing conditions for curable fluoropolyether compositions include temperatures between 160° C. and 210° C., typically 177° C. during 6 to 90 minutes. A pressure of 10 to 100 bar may be applied during the curing. Typically the curing is carried out over at least 30 minutes or at least 45 minutes. A post cure may be applied, typically at a temperature greater 200° C. for 20 hours, preferably at ambient pressure or pressures as described above.

The cured fluoropolyether compositions typically reach a maximum torque (MH-ML) (measured according to ASTM D 5289-93a) greater than 4.

The resulting polymers have low glass transition temperatures, for example glass transition temperatures of leas than about −60° C., less than about −80° C. or even less than about −100° C.

Curable Fluoropolyether Compositions

As described above the curable compositions contain the fluoropolyethers and the curing agents described above.

The compositions are curable, by which is meant that they react to form a polymer having groups with a triazine ring structure at curing conditions, which include, preferably, temperatures greater than about 40° C., preferably at temperatures greater than about 100° C. or between about 150° C. and about 180° C. By curing the compositions the fluoropolyether-based polymers can be formed having the glass transition temperatures and mechanical properties described herein. Preferably, the compositions can be cured to form elastomers.

From the above it is apparent that the triazine-containing groups described above and below are substituted triazines because the curing co-agent gets incorporated into the triazine moiety. Typically, the residue or linking group of the curing agents forms a substituent, more specifically a side chain, of the triazine ring structure.

The curable or precursor compositions typically contain fluoropolyethers and curing agents in the amounts or molar ratios as described above. Additionally, fluoropolyether precursor compositions may contain fillers and other ingredients as described above and in the amounts or ratio as above.

Cured Fluoropolyether-Based Polymers

The cured fluoropolyether-based polymers provided herein and the compositions containing them have a glass transition temperature of less than about −60° C., less than about −70° C., less than about −80° C. or even less than about −100° C.

The cured fluoropolyether-based polymers or compositions containing them have an elongation at break of at least 10%. They are of a rubber-like consistency. The cured fluoropolyether-based polymers provided herein are elastomers. This means they have elastomeric properties. This means they can be stretched to at 10% of their initial length by applying a suitable force (as described in the method section with respect to elongation at break) and that retain their original length after the application of that force has been discontinued.

Preferably, the cured fluoropolyether-based polymers have a fluorine content of greater than about 40% by weight, of at least 50% by weight based on the weight of the polymer. The cured fluoropolyether-based polymers or compositions containing them are suitable for use in making O-rings or seals.

Preferably, the fluoropolyether-based polymers or polymer compositions have an elongation at break of at least 50%. Preferably, they have in addition also a shore A hardness of at least 15. More preferably, they have in addition also a tensile strength of at least 1 MPa.

The cured fluoropolyether-based polymers or polymer compositions provided herein are the reaction product of a triazine group forming reaction between the fluoropolyethers described above and the curing co-agents described above. This means they are obtainable by a curing reaction of fluoropolyethers and curing agents described above, optionally in the presence of one or more filler and additional ingredients as described above.

Therefore, the cured fluoropolyether-based polymers or polymer compositions have triazine group containing links. The triazine groups typically also contain a side chain derived from the linking group of the curing co-agent, for example the group R as described above. Typically, the cured fluoropolyether-based polymers or polymer compositions provided herein contain or consist of units selected from ($-CF_2O-$), ($-C_2F_4O-$), ($-C_4F_8O-$), or a combination thereof that have a molecular weight of from about 400 g/mol to about 15,000 g/mol and that are separated from each other by one or more groups having a triazine ring structure, more specifically, by a triazine group moiety that contains at least one side chain derived from a linking group R as described above. The polymers or polymer compositions may further contain (—$C_3F_6O$—) units. Preferably, the cured fluoropolyether-based polymers and polymer compositions provided herein contain fluoropolyether units selected from (—$CF_2O$—); (—$CF_2O$—) and (—$C_2F_4O$—); (—$CF_2O$—), (—$C_2F_4O$—) and (—$C_4F_8O$—); or a combination thereof and that are separated from each other by a triazine group containing moiety, more specifically, by a triazine group moiety that contains at least one side chain derived from a linking group R as described above. Preferably such fluoropolyether units have a molecular weight of from about 400 g/mol to about 15,000 g/mol.

The cured fluoropolyether-based polymer or polymer compositions obtainable by the methods described herein may have one or more or all of the following properties:

(i) a glass transition temperature (Tg) of less than −60° C., preferably less than −70° C., more preferably less than −80° C. or less than −100° C.;

(ii) an elongation at break of at least 50%;

(iii) a tensile strength of at least 1 MPa, preferably at least 1.3 MPa;

(iv) a shore A hardness of at least 15, preferably at least 25 and more preferably at least 40;

Typical embodiments of cured fluoropolyether-based polymers or compositions containing them have a glass transition temperature of less than −60° C., a tensile strength of at least 1 MPa, a shore A hardness of at least 25, an elongation at break of at least 50% and a fluorine content of at least 40% by weight.

Articles and Methods of Making Articles:

The curable compositions provided herein may be used to make shaped articles, for example, by molding. Conventional processing techniques used in fluoropolymer compounding or processing may be used, such as injection molding, in particular liquid injection molding, or compression molding. Alternatively, articles in the form of a sheet can be made by curing a layer of the fluoropolyether compositions in an open air oven. Such sheets can be further shaped by cutting or stamping methods.

Compression molding typically comprises placing an uncured elastomer composition into a heated mold cavity and subsequently closing the mold using adequate pressure to shape the article. After retaining the rubber-like material at sufficient temperature for sufficient time to allow vulcanization (curing) to proceed, it is typically demolded.

Liquid injection molding is a shaping technique whereby the curable composition is pumped into a heated chamber from which it is then injected into a hollow mold cavity by hydraulic means (e.g. a piston). After vulcanization (curing) the shaped article is demolded.

The curable compositions provided herein may be used to make articles for use in the aircraft, aerospace and motor industries. Typical examples of suitable articles include seals, more particularly seals having at least one surface facing or to be applied to face a liquid or gaseous hydrocarbon. Typically, the seals are components of a fuel management system comprising at least one fuel pump and/or at least one fuel injector, wherein the fuel preferably is a hydrocarbon. Examples of such components or suitable articles in general include O-rings, shaft seals, gaskets, tubes, linings, sheets, containers, lids, hoses or components thereof, membranes and bonded seals. Specific examples of articles include components of a fuel system as described above wherein the fuel system is the fuel system of a motor vehicle, an airplane, a helicopter, a rocket, a space shuttle, or a water craft. Other articles include a component of a satellite (including the articles described above).

The curable compositions provided herein may be used to make articles for use in the liquefying gases and storing liquefied gases, such a He, Ne, natural gas and other hydrocarbons. Examples include but are not limited to LNG (liquefied natural gas), CNG (compressed natural gas), synthetic natural gas (CNG), liquid petroleum gas (LPG) and GTL gases (gas-to-liquid gases). Typical examples of suitable articles include seals, like, for example, O-rings. The seals may have at least one surface facing or to be applied to face a liquid or gaseous hydrocarbon or noble gas or a mixture thereof. The seals, for example, may be components of valves. Examples of valves include ball valves, butterfly valves and the like. The valves may be components of coupling in liquefied gas terminal or in a processing unit to prepare liquefied gases, for example by expansion. Further examples include seals, or sealing components of valves, that are components of a liquefied gas storage device or a device for cooling gases by gas expansion. Examples include liquefied gas storage containers, for example for transport like shipping or by vessel or motor vehicles, or as storage unit in a liquefied gas terminal. Examples include seals or components of seals including O-rings, tubes or components of tubes and the like.

In the following list specific embodiments will be described to further illustrate the invention. This list is provided for illustrative purposes only and is not meant to limit the invention thereto.

1. A curable composition comprising a) fluoropolyethers having a molecular weight of from about 400 g/mole up to about 20,000 g/mole and containing moieties selected from (—$(CF_2)_4O$—), (—$(CF_2)_2O$—), (—$CF_2O$—) or combinations thereof and further containing at least one nitrile group at a terminal position or at a position that is adjacent to the terminal position;

b) one or more curing agents selected from non-fluorinated compounds containing one or more functional group linked to a common residue, said residue containing at least three carbon atoms wherein the functional groups are selected from primary amines, secondary amines and functional groups that generate primary or secondary amines upon a heat treatment, wherein the composition can be cured to generate groups having a triazine ring structure.

2. The curable composition of embodiment 1 wherein the fluoropolyethers are represented by the general formula

wherein X and Y independently from each other represent a nitrile, a perfluoroalkylnitrile or a perfluoroalkyl group with the proviso that at least one of X or Y is a nitrile or perfluoroalkylnitrile group, A denotes a fluoropolyether unit comprising, consisting or consisting essentially of a plurality of units selected from (—$(CF_2)_4O$—), (—$(CF_2)_2O$—), (—$CF_2O$—) or combinations thereof.

3. The curable composition of embodiments 1 or 2 wherein the curing agent is represented by the formula:

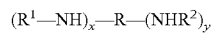

wherein each $R^1$ and $R^2$ independently represent H, an aliphatic group or a group —COOR' with R' representing H, an ammonium compound, a metal atom or an alkyl group;

R represents a linking group linking the functional groups ($R^1$—NH)$_x$— and —(NHR$^2$)$_y$ and contains at least 3 carbon atoms, x represents an integer from 1 to 5 and y represents an integer from 1 to 5.

4. The curable composition of any one of the preceding embodiments wherein the curing agent is represented by the formula:

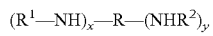

wherein each $R^1$ and $R^2$ independently represent H, an aliphatic group or a group —COOR' with R' representing H, an ammonium compound, a metal atom or an alkyl group;

R represents a linking group linking the functional groups $(R^1-NH)_x$— and —$(NHR^2)_y$ and is selected from linear or branched alkylenes, aryls, heteroaryls, arylalkylenes and heteroarylalkylenes;

x represents an integer from 1 to 5 and y represents an integer from 1 to 5, and the preferably the sum of x and y is at least 2 and less than 5.

5. The curable composition of any one of the preceding embodiments wherein the curing agent is selected from alkylene diamines, alkylene diamine carbamates, nitrogen-heteroaryl amines.

6. The curable composition of any one of the preceding embodiments wherein the curing agent has a molecular weight of less than 2,000 g/mole or less than 1,000 g/mole.

7. The curable composition of any one of the preceding embodiments wherein the fluoropolyethers further comprises a plurality of branched —$(C_3F_6O)$— units.

8. The curable composition of any one of the preceding embodiments further comprising at least one filler.

9. The curable composition of any one of any one of the preceding embodiments comprising a filler containing particles containing a carbon material or a silicon oxide material.

10. The curable composition of any one of the preceding embodiments wherein the fluoropolyethers and curing agent are present in a weight ratio of fluoropolyethers to curing agents of greater 10.

11. The curable composition of any one of the preceding embodiments wherein the fluoropolyethers and curing agent are present in a weight ratio of fluoropolyethers to curing agents of greater 20 and up to 500.

12. A composition comprising a cured fluoropolyether-based polymer containing groups having a triazine ring structure obtainable by curing the curable compositions according to any one of the preceding embodiments.

13. The composition according to embodiment 12 having a glass transition temperature of at least −60° C. and one or more of the mechanical properties selected from
a) an elongation at break of at least 50%;
b) a shore A hardness of at least 15; and
c) a tensile strength of at least 1 MPa.

14. A composition comprising a cured fluoropolyether-based polymer containing fluoropolyether segments having a molecular weight of from about 400 g/mole up to about 20,000 g/mole and containing a plurality of moieties selected from (—$(CF_2)_4O$—), (—$(CF_2)_2O$—), (—$CF_2O$—) or combinations thereof and being separated by groups having a triazine ring structure, wherein the composition has a glass transition temperature of at least −60° C.

15. The composition according to embodiment 14 having a glass transition temperature of at least −60° C. and one or more of the mechanical properties selected from
a) an elongation at break of at least 50%;
b) a shore A hardness of at least 15; and
c) a tensile strength of at least 1 MPa.

16. The composition according to embodiments 12 to 15 wherein the cured fluoropolyether-based polymer is an elastomer.

17. The composition according to embodiments 12 to 15 wherein the cured fluoropolyether-based polymer has a fluorine content of at least 50% by weight based on the total weight of the polymer.

18. A method of making a composition comprising a cured fluoropolyether-based polymer having groups with a triazine ring structure and a glass transition temperature of less than −60° C. said method comprising
i) providing a curable composition according to any one of embodiments 1 to 11 and
ii) subjecting the curable composition to heat curing to create groups having a triazine ring structure.

19. The method of embodiment 18 wherein the composition comprising the cured fluoropolyether-based polymer has at least one or more of the mechanical properties selected from
a) an elongation at break of at least 50%;
b) a shore A hardness of at least 15; and
c) a tensile strength of at least 1 MPa.

20. The method of embodiments 18 and 19 wherein the cured fluoropolyether-based polymer has a fluorine content of at least 50% by weight based on the total weight of the polymer.

21. A molded article obtained by molding the curable composition according to any one of embodiments 1 to 11.

22. The molded article of embodiment 21 being a seal.

23. The molded article of embodiment 21 being a component of a fuel management system.

24. The molded article of embodiment 23 wherein the fuel management system is the fuel management system of an aircraft, a motor vehicle or a water craft.

25. The molded article of embodiment 21 or 22 being a component of a storage device for liquefied gases or a device for liquefying gases by gas expansion.

26. The molded article according to any one of embodiments 21 to 24 comprising a cured fluoropolyether-based polymer containing fluoropolyether segments having a molecular weight of from about 400 g/mole up to about 20,000 g/mole and containing a plurality of moieties selected from (—$(CF_2)_4O$—), (—$(CF_2)_2O$—), (—$CF_2O$—) or combinations thereof separated by groups having a triazine ring structure, wherein the composition has a glass transition temperature of at least −60° C.

27. The molded article according to any one of the embodiments 21 to 26 being obtainable by injection molding or compression molding.

28. A method of making a shaped article comprising molding a curable composition according to any one of embodiments 1 to 11.

29. The method according to embodiment 28 wherein the molding is injection or compression molding.

The following examples are provided to further illustrate the compositions and methods provided herein. These following examples are provided to illustrate certain embodiments but are not meant to limit the invention thereto. Prior to that some test methods used to characterize materials and their properties will be described. Unless specified otherwise, percentages are percentages by weight with respect to the mass of the total compositions and add up in each case to 100 weight percent.

EXAMPLES

Test Methods

Hardness:

Hardness Shore A (2") was measured on samples that were post cured for 20 hours at 250° C., according to ASTM D-2240.

Glass Transition Temperature (Tg):

Tg was measured by modulated temperature DSC using a TA Instruments Q200 modulated DSC, available from TA Instruments. Conditions of measurement: −150° C. to 50° C. @ 2 or 3° C./min, modulation amplitude of +−1° C./min during 60 sec.

Tensile Strength at Break, Elongation at Break and Stress at 100% Elongation:

These properties were determined using a mechanical tester available under the trade designation "Instron" with a 1 kN load cell in accordance with DIN 53504 (S2 DIE). All tests were run at a constant cross head displacement rate of 200 mm/min. Each test was run three times. The values reported are averages of the three tests.

Stress at 100% Elongation, Elongation at Break, and Tensile Strength at Break were reported in units of Mega Pascals (MPa), %, and MPa respectively. Elastomeric properties can be determined as done for measuring the elongation at break. The sample is stretched to 10% of its original length. Then the stretching is stopped and the sample is allowed to regain its original shape. The sample is elastomeric if it regains its original length within 15 minutes.

Curing Properties:

Vulcanisation properties were measured using an Alpha Technologies Moving Die Rheometer (at 177° C. in accordance with ASTM D 5289-93a, reporting minimum torque (ML), maximum torque (MH) and delta torque (which is the difference between MH and ML). Torque values are reported in .lbs. Also reported are tg δ @ ML and tg δ MH. Further reported are parameters indicating the curing speed such as Ts2 (the time required to increase the torque by two units over the ML); T50 (the time to increase torque above ML by 50% of delta torque), and T90 (the time to increase torque above ML by 90% of delta torque), all of which were reported in minutes.

Presence of Triazine Rings:

The presence of triazine rings was indicated by a strong absorption peak at 1550-1560 cm$^{-1}$ in FT-IR analysis. 50 µm thin samples of cured or post cured samples were submitted to FT-IR analysis.

Sample Preparation

Fluoroelastomer compounds in the form of a paste, were made by mixing in a speedmixer available under the trade designation "Hauschild Speedmixer" (1 min at 2000 rpm, 1 min at 3500 rpm), 100 parts by weight of fluoropolyether with non-fluorinated compound having at least one primary or secondary amine and fillers in parts per 100 parts by weight of perfluoropolyether as is given in the respective examples. The pastes were press cured in an Agila press (Agila PE 60 press from Agila NV in Ieper, Belgium, which is an example of a typical Rubber press with heated plates). Curing was carried out at 177° C. for 30 min and under a pressure of 20 bar. The fluoroelastomers were post cured in an oven during 20 hours at 250° C.

Materials Used:

Functionalised Fluoropolyethers (PFE)

PFE-1: NCCF$_2$O(CF$_2$O)$_{9-11}$(CF$_2$CF$_2$O)$_{9-11}$CF$_2$CN

PFE-1 was made starting from the perfluoropolyetherdiester CH$_3$OC(O)CF$_2$O(CF$_2$O)$_{9-11}$(CF$_2$CF$_2$O)$_{9-11}$CF$_2$C(O)OCH$_3$ (average molecular weight of about 2000, obtained under the trade designation "Fomblin Z-DEAL" from Solvay Solexis) according to the process described in U.S. Pat. No. 5,545,693, example 3. In a first step, the perfluoropolyether diester was converted to the corresponding dicarbonamide using ammonia gas. In a second step, the dicarbonamide was converted to the corresponding dinitrile.

PFE-2: NC(CF$_2$CF$_2$O)n-CF$_2$CF$_2$CN

PFE-2 was prepared according to the procedure outlined for PFE-1, but starting from PFE0-diester, having a molecular weight of 850 and commercially available from Exfluor, Tex.

Curing Co-Agents

Ethylene diamine: available from Aldrich

Melamine: available from Alddrich

DIAK1: hexamethylene diamine carbamate, available from DuPont.

Fillers

An aerogel available under the trade designation "Nanogel" from Cabot Corporation A high surface area fumed silica available under the trade designation "Cab-O-Sil TS530" from Cabot Corporation A graphite fluoride available under the trade designation "Carbofluor 2065" from Advanced Research Co.

EXAMPLES

Example 1

A paste was made by mixing 100 parts PFE-1, 0.33 parts ethylenediamine, 7.5 parts Nanogel. The paste was press cured for 30 min at 177° C., followed by 16 hrs post cure at 230° C. The curing behaviour and properties of cured fluoroelastomer are given in table 1.

TABLE 1

| ML (in · lbs) | 0.33 |
|---|---|
| MH (in · lbs) | 11.39 |
| tg δ @ML | 0.545 |
| tg δ @MH | 0.03 |
| Ts2 (min) | 8.42 |
| T50 (min) | 10.59 |
| T90 (min) | 13.2 |
| Hardness shA (post cured) | 37 |
| Tg (° C.) | −116.2 |

Example 2

In example 2, a paste was made by mixing 100 parts PFE-1, 7.5 parts Nanogel and 0.92 parts melamine. The paste was press cured for 7 min at 177° C., followed by 16 hrs post cure at 230° C. The curing behaviour and properties of cured fluoroelastomer are given in table 2.

TABLE 2

| Fluoroelastomer properties | |
|---|---|
| ML (in · lbs) | 0.32 |
| MH (in · lbs) | 11.42 |
| tg δ @ML | 0.467 |
| tg δ @MH | 0.014 |
| Ts2 (min) | 26.57 |
| T50 (min) | 30.67 |
| T90 (min) | 37.35 |
| Hardness shA (post cured) | 47 |
| Tg (° C.) | −117.2 |

Example 3

In example 3, a paste was made by mixing 100 parts PFE-1, 2 parts AEROSIL 200V, 20 parts Carbofluor 2065, 5 parts nanogel and 0.75 parts DIAK 1. The paste was press cured for min at 177° C., followed by post cure at 170° C. during 60 min. The curing behaviour and properties of cured fluoroelastomer are given in table 3.

TABLE 3

| | |
|---|---|
| ML (in · lbs) | 1.0 |
| MH (in · lbs) | 21.26 |
| tg δ @ML | 0.39 |
| tg δ @MH | 0.032 |
| Ts2 (min) | 2.84 |
| T50 (min) | 5.98 |
| T90 (min) | 8.89 |
| Properties after post cure | |
| Hardness shA | 62 |
| Stress at 100% elongation (MPa) | 2.4 |
| Tensile strength (MPa) | 2.75 |
| Elongation at break (%) | 123 |

Example 4

In example 4 and example 5, a paste was made by mixing 100 parts PFE-2, 7.5 parts Nanogel and 1.3 parts melamine (ex 5) or 0.462 ethylenediamine (ex 6). The pastes were press cured for 7 min at 177° C., followed by 16 hrs post cure at 200° C. The curing behaviour and properties of the cured fluoroelastomer are given in table 4.

TABLE 4

| | Ex 4 | Ex 5 |
|---|---|---|
| ML (in · lbs) | 0.11 | 1.24 |
| MH (in · lbs) | 6.86 | 8.66 |
| tg δ @ML | 0.727 | 0.655 |
| tg δ @MH | 0.05 | 0.042 |
| Ts2 (min) | 29.88 | 154.15 |
| T50 (min) | 32.5 | 15.82 |
| T90 (min) | 38.88 | 18.52 |
| Tg (° C.) | −86.06° C. | |

The invention claimed is:

1. A curable composition comprising
   a) perfluoropolyethers having a molecular weight of from about 400 g/mole up to about 20,000 g/mole and containing moieties selected from the group consisting of ($-(CF_2)_4O-$), ($-(CF_2)_2O-$), ($-CF_2O-$) and combinations thereof and further containing at least one nitrile group at a terminal position or at a position that is adjacent to the terminal position;
   b) one or more curing agents selected from non-fluorinated compounds containing one or more functional group linked to a common residue, said residue containing at least three carbon atoms wherein the functional groups are selected from primary amines, secondary amines and functional groups that generate primary or secondary amines upon a heat treatment,
   wherein the composition can be cured to generate a cured polymer comprising segments of the perfluoropolyethers separated by groups having a triazine ring structure.

2. The curable composition of claim 1 wherein the perfluoropolyethers are represented by the general formula

X-A-Y wherein X and Y independently from each other represent a nitrile, a perfluoroalkylnitrile or a perfluoroalkyl group with the proviso that at least one of X or Y is a nitrile or perfluoroalkylnitrile group, A denotes a perfluoropolyether unit comprising a plurality of units selected from the group consisting of ($-(CF_2)_4O-$), ($-(CF_2)_2O-$), ($-CF_2O-$) and combinations thereof.

3. The curable composition of claim 1 wherein the curing agent is represented by the formula:

$(R^1-NH)_x-R-(NHR^2)_y$ wherein each $R^1$ and $R^2$ independently represent H, an aliphatic group or a group —COOR' with R' representing H, an ammonium compound, a metal atom or an alkyl group;
   R represents a linking group linking the functional groups $(R^1-NH)_x$— and —$(NHR^2)_y$ and contains at least 3 carbon atoms, x represents an integer from 1 to 5 and y represents an integer from 1 to 5.

4. The curable composition of claim 1 wherein the curing agent is represented by the formula:

$(R^1-NH)_x-R-(NHR^2)_y$ wherein each $R^1$ and $R^2$ independently represent H, an aliphatic group or a group —COOR' with R' representing H, an ammonium compound, a metal atom or an alkyl group;
   R represents a linking group linking the functional groups $(R^1-NH)_x$— and —$(NHR^2)_y$ and is selected from the group consisting of linear or branched alkylenes, aryls, heteroaryls, arylalkylenes and heteroarylalkylenes;
   x represents an integer from 1 to 5 and y represents an integer from 1 to 5, and the sum of x and y is at least 2 and less than 5.

5. The curable composition of claim 1 wherein the curing agent is selected from the group consisting of alkylene diamines, alkylene diamine carbamates, and nitrogen-heteroaryl amines.

6. The curable composition of claim 1 wherein the perfluoropolyethers further comprise branched —($C_3F_6O$)— units.

7. The curable composition of claim 1 further comprising at least one filler.

8. A composition comprising a cured perfluoropolyether-based polymer containing perfluoropolyether segments having a molecular weight of from about 400 g/mole up to about 20,000 g/mole and containing a plurality of moieties selected from the group consisting of ($-(CF_2)_4O-$), ($-(CF_2)_2O-$), ($-CF_2O-$) and combinations thereof and being separated by groups having a triazine ring structure derived from the reaction of one or more curing agent selected from non-fluorinated compounds containing one or more functional group linked to a common residue, said residue containing at least three carbon atoms wherein the functional groups are selected from primary amines, secondary amines and functional groups that generate primary or secondary amines upon a heat treatment, wherein the composition has a glass transition temperature of from −60° C. to −120° C.

9. The composition of claim 8 having a glass transition temperature of from −60° C. to −120° C. and one or more of the mechanical properties selected from the group consisting of:
   a) an elongation at break of at least 50%;
   b) a shore A hardness of at least 15; and
   c) a tensile strength of at least 1 MPa.

10. The composition of claim 8 wherein the perfluoropolyether segment further comprises a plurality of branched —($C_3F_6O$)— units.

11. The composition of claim 8 wherein the perfluoropolyether-based polymer is an elastomer.

12. A molded article comprising a cured perfluoropolyether-based polymer containing perfluoropolyether segments having a molecular weight of from about 400 g/mole up to about 20,000 g/mole and containing a plurality of moieties selected from the group consisting of ($-(CF_2)_4O-$), (—(CF$_2$)$_2$O—), (—CF$_2$O—) and combinations thereof separated by groups having a triazine ring structure derived from the reaction of one or more curing agent selected from non-fluorinated compounds containing one or more functional group linked to a common residue, said residue containing at least three carbon atoms wherein the functional groups are selected from primary amines, secondary amines and functional groups that generate primary or secondary amines upon a heat treatment, wherein the composition has a glass transition temperature of from 60° C. to −120° C.

13. The molded article of claim 12 being a seal that is part of a fuel management system or a component of a device for storing or producing liquefied gases.

* * * * *

UNITED STATES PATENT AND TRADEMARK OFFICE
CERTIFICATE OF CORRECTION

PATENT NO.           : 9,290,619 B2
APPLICATION NO.      : 14/003141
DATED                : March 22, 2016
INVENTOR(S)          : Guerra et al.

It is certified that error appears in the above-identified patent and that said Letters Patent is hereby corrected as shown below:

Title Page, item (56)

Column 2 (First Page)
Line 4, Delete "perfloronitriles" and insert -- perfluoronitriles --, therefor.

In the Specification

Column 4
Line 7, Delete "perflourinated" and insert -- perfluorinated --, therefor.
Line 57, Delete "fluoroplyethers" and insert -- fluoropolyethers --, therefor.

Column 6
Line 63, Delete "fluorpolyethers" and insert -- fluoropolyethers --, therefor.

Column 9
Line 60, Delete "leas" and insert -- less --, therefor.

Column 15
Line 66, Delete "PFE0-" and insert -- PFEO- --, therefor.

Column 16
Line 4, Delete "Alddrich" and insert -- Aldrich --, therefor.

In the Claims

Column 19
Line 10, In Claim 12, delete "60° C." and insert -- –60° C. --, therefor.

Signed and Sealed this
Second Day of August, 2016

Michelle K. Lee
*Director of the United States Patent and Trademark Office*